United States Patent [19]

Svensson

[11] Patent Number: 5,687,216

[45] Date of Patent: Nov. 11, 1997

[54] APPARATUS FOR STORING MESSAGES IN A CELLULAR MOBILE TERMINAL

[75] Inventor: Jan Svensson, Lund, Sweden

[73] Assignee: Ericsson Inc., Research Triangle Park, N.C.

[21] Appl. No.: 645,160

[22] Filed: May 13, 1996

Related U.S. Application Data

[63] Continuation of Ser. No. 337,510, Nov. 8, 1994, abandoned, which is a continuation of Ser. No. 114,089, Aug. 31, 1993, abandoned.

[51] Int. Cl.$^6$ ............................................. H04Q 7/32
[52] U.S. Cl. ........................ 379/58; 379/59; 379/357; 455/89
[58] Field of Search ................................ 379/58, 59, 63, 379/144, 354, 355, 357, 96; 340/825.44; 455/33.1, 54.1, 89, 90; 235/486, 492, 380

[56] References Cited

U.S. PATENT DOCUMENTS

| | | | |
|---|---|---|---|
| 4,477,808 | 10/1984 | Ichikawa | 340/825.44 |
| 4,682,014 | 7/1987 | Iwama | 379/357 |
| 4,779,091 | 10/1988 | Oyagi et al. | 340/825.44 |
| 4,805,211 | 2/1989 | Brennan et al. | 379/355 |
| 4,839,628 | 6/1989 | Davis et al. | 340/311.1 |
| 4,855,731 | 8/1989 | Yoshizawa et al. | 340/825.44 |
| 4,900,902 | 2/1990 | Sakakibara | 374/144 |
| 5,049,874 | 9/1991 | Ishida et al. | 340/825.44 |
| 5,105,189 | 4/1992 | Murai et al. | |
| 5,119,414 | 6/1992 | Izumi | 379/357 |
| 5,134,717 | 7/1992 | Sogaard Rasmussen | 455/89 |
| 5,148,473 | 9/1992 | Freeland et al. | 379/59 |
| 5,177,477 | 1/1993 | Fennell et al. | 340/825.44 |
| 5,177,780 | 1/1993 | Kasper et al. | 379/59 |
| 5,247,572 | 9/1993 | Koma | 379/359 |
| 5,251,250 | 10/1993 | Obata et al. | 379/59 |
| 5,266,782 | 11/1993 | Alanara et al. | 235/380 |
| 5,353,328 | 10/1994 | Jokimies | 379/58 |
| 5,402,477 | 3/1995 | McMahan et al. | 379/96 X |

FOREIGN PATENT DOCUMENTS

| | | |
|---|---|---|
| 0458563 A2 | of 0000 | European Pat. Off. |
| 369110 | 5/1990 | European Pat. Off. |
| 2-13141 | of 0000 | Japan |
| WO90/06648 | of 0000 | WIPO |
| 9326131 | 12/1993 | WIPO |

OTHER PUBLICATIONS

"Point-to-Point Short Message Service Support on Mobile Radio Interface", GSM Recommendations ETSI/TC GSM 04.11 version 3.3.0, Jan. 1993, pp. 1-73.

"Technical Realization of the Short Message Service—Point-to-Point", GSM Recommendations ETSI/TC GSM 03.40—version 3.5.0-1, Jan. 1991, pp. 1-100.

*Primary Examiner*—Dwayne Bost
*Assistant Examiner*—William G. Trost
*Attorney, Agent, or Firm*—Burns, Doane, Swecker & Mathis, L.L.P.

[57] ABSTRACT

A mobile communications terminal is provided with includes a receiver apparatus for receiving messages, an internal memory for storing the messages received by said receiver means, a removable external memory for storing messages, and wherein cooperation is provided between the internal memory and the external memory by transferring messages stored in the internal memory into the external memory. A method of providing cooperation between an internal memory and an external memory in a cellular mobile communications terminal is also disclosed.

30 Claims, 2 Drawing Sheets

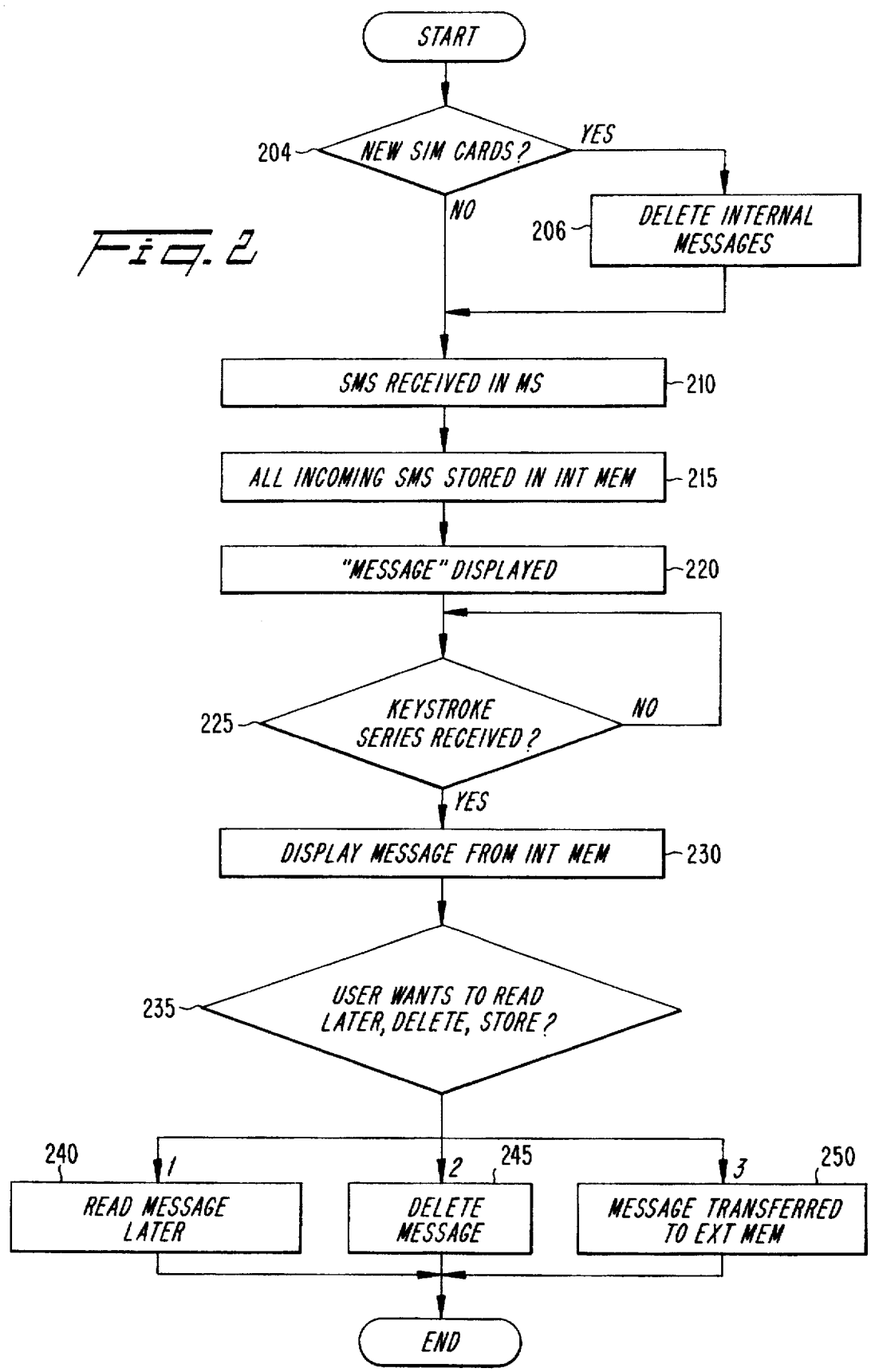

APPARATUS FOR STORING MESSAGES IN A CELLULAR MOBILE TERMINAL

This application is a continuation of application Ser. No. 08/337,510, filed Nov. 8, 1994, now abandoned, which is a continuation of application Ser. No. 08/114,089, filed Aug. 31, 1993, (now abandoned).

BACKGROUND

The present invention is directed to an apparatus for storing messages in a cellular mobile terminal, in particular, a cellular mobile terminal including an internal memory, a removable connectable external memory and an apparatus for providing cooperation between the two memories.

The Global System for Mobile Communications (GSM) standards, in place in Europe, call for a short message service (SMS) feature which makes it possible to send short messages between either two GSM mobile communications terminals (e.g., mobile telephones) or from a special SMS service center to a mobile communications terminal. The specification for the SMS is found in ETSI/TL GSM Recommendations 03.40. According to the standards, a message can contain a maximum of 160 characters. This feature is similar to a pager having a message capability.

Currently, in mobile communications terminals on the market in Europe, the incoming SMS is stored in either an internal memory or on an external memory on a Subscriber Identity Module (SIM) card. The user must choose which memory he wants to use.

However, these memories are of limited size. If the user does not delete the message as soon as it is read, the memories reach their capacity. This renders it impossible to receive any new SMS messages. Users may not always want to delete the messages since they may include some important information that the user will want to use at a later time. This may cause problems for some users in that they will be forced to delete messages they would prefer to retain in order to create space for new SMS messages.

It is also possible with conventional mobile communications terminals to transport a stored message to another mobile terminal by moving the SIM card. However, in this case, the message must be stored on the external memory in the SIM card from the start as there is no mechanism by which messages once stored in internal memory, can be moved by the user to the external memory. The external memory is smaller than the internal memory, which increases the risk of filling the memory if the external memory is chosen.

Radio pagers have in known systems, included an internal memory which is operated on a first-in, first-out basis and a second internal memory which can be used to protect a message from being overwritten. U.S. Pat. No. 4,477,808 to Ichikawa discloses such a system. However, in the Ichikawa system, the second internal memory is a shift register which looses its contents when the power is turned off or the register is overwritten.

Also known in conventional mobile radios is the use of an internal memory and an external memory for storage of telephone numbers for speed dialing purposes. For example, U.S. Pat. No. 5,134,717 to Sogaard Rasmussen discloses a system in which the user selects the memory in which he would like a telephone number to be stored by selecting the address into which the number is to be stored. Certain addresses are reserved for the internal memory and others are reserved for the external memory. The user can move a telephone number stored in one memory to the other memory by changing the address of the stored number. Numbers stored in both memories are retained until deleted by the user by storing another number in a previously used address. However, no provision is made to differentiate between temporarily stored numbers and permanently stored numbers and no provision is made to protect a stored number from being overwritten by the user. This system requires a user to remember which addresses he has used and which number he has stored in which address. With up to 100 possible addresses, this requirement can be a great disadvantage.

SUMMARY

It is accordingly an object of the present invention to use the internal memory and the external memory cooperatively to solve the problems noted above.

It is another object of the present invention to use the internal and external memories together in a cooperative manner to reduce the risk of running out of memory.

It is another object of the present invention to maintain a message in a semi-stored state by organizing the internal memory as a first-in, first-out memory.

It is another object of the present invention to allow the user to decide after reading a particular message whether he wants to store it internally or make it transportable to another mobile communications terminal by transferring the message to the external memory on the SIM card.

It is another object of the present invention to make an understandable man-machine interface by providing the user with a difference in how he accesses the external and internal memory.

According to one embodiment of the present invention, an apparatus is disclosed for providing cooperation between memories in a mobile communications terminal, the terminal including a display means, the apparatus comprising first means for storing at least one message in the mobile communications terminal, means for receiving at least one message and storing the received message in the first means for storing, means for inputting command relating to the at least one message displayed on the display means, second means for storing messages, the second means for storing being removably connectable to the mobile communications terminal, and means for transferring the at least one message to the second means for storing responsive to a store command input by the inputting means.

According to another embodiment of the present invention, a mobile communications terminal is disclosed comprising receiver means for receiving at least one message, an internal memory for storing the at least one message received by the receiver means, a removable external memory for storing messages, and means for providing cooperation between the internal memory and external memory, the means for providing cooperation comprising means for transferring at least one message stored in the internal memory into the external memory.

According to another embodiment of the present invention, a method of providing cooperation between an internal memory and an external memory in a cellular mobile communications terminal is disclosed, the method comprising the steps of storing a received message in the internal memory, displaying the received message on a display in the cellular mobile communications terminal, accepting commands concerning the displayed message selected by a user of the terminal and input using a keypad, and transferring the displayed message to the external memory in response to a transfer command accepted in the step of accepting commands.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 2 is a flowchart of a software routine according to an embodiment of the present invention.

DETAILED DESCRIPTION

Figure 1:
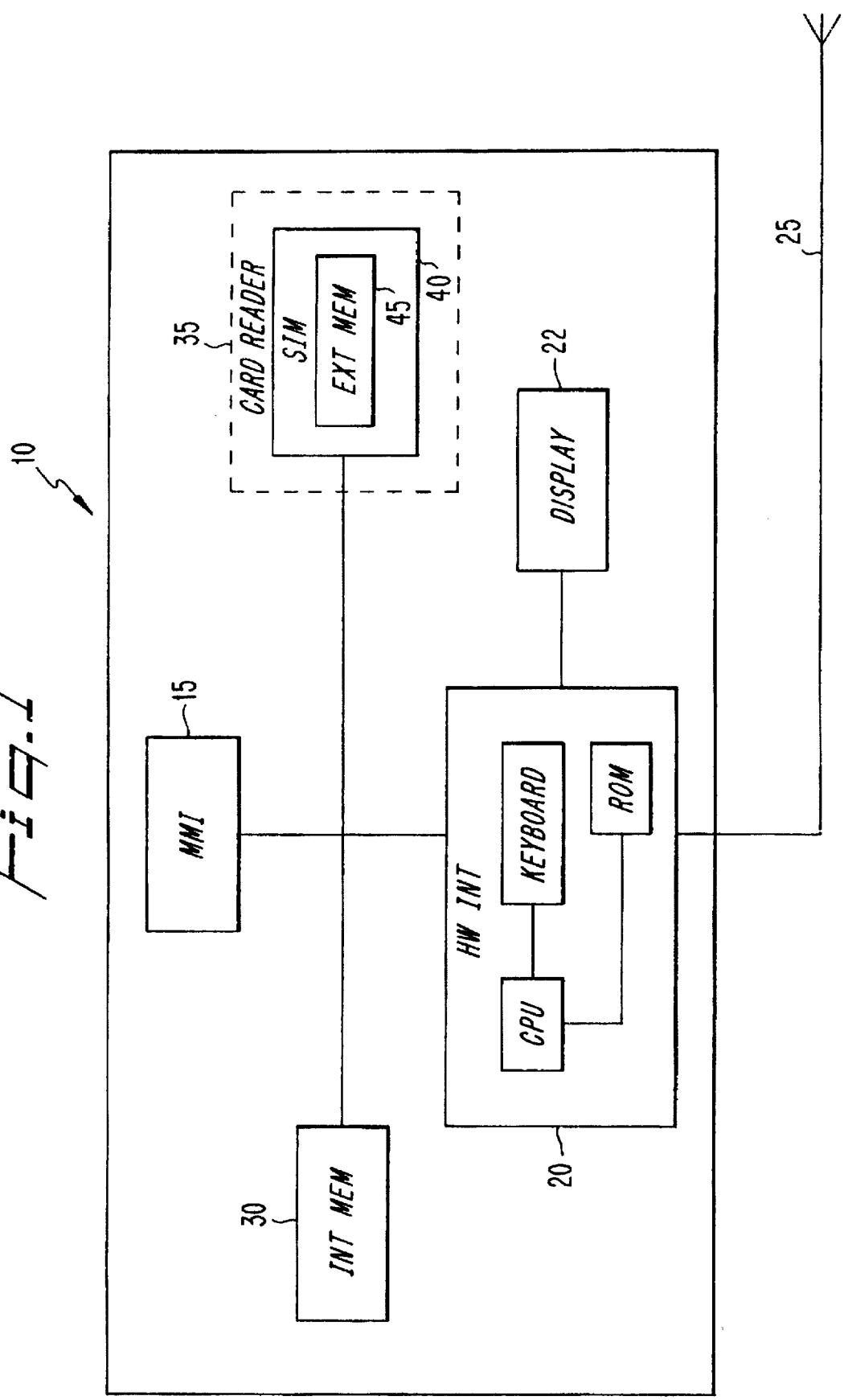
FIG. 1 is an exemplary block diagram of the pertinent portions of a cellular mobile communications terminal according to an embodiment of the present invention.

According to the present invention, a cellular mobile communications terminal (for example, a mobile telephone) includes an internal memory and an external, removably connectable memory in a SIM card or other removable card. SMS messages are received by the antenna of the cellular mobile unit and are temporarily stored in the internal memory. An optimal system according to the present invention is one in which the user stores only those messages which he is truly interested in saving in the external memory. Those messages that the user only needs for a short time would not be stored by the user, but would be automatically stored by the mobile communications terminal for a short time. According to a preferred embodiment, this optimal solution is achieved by a system which allows cooperation between the internal and the external memories.

According to a preferred embodiment of the present invention, all incoming messages received by the antenna in the cellular mobile terminal are directly sent to the internal memory. The user is alerted and can read the message when he chooses to do so. After reading the message, the user can either decide to store it more permanently in the external memory in the SIM card or leave it in the internal memory. If the SIM card memory is full when the user wants to save a new message in the SIM memory, the user will be informed on the display and asked to delete at least one message from the SIM memory in order to make room for the new message.

If the user decides to leave the message in the internal memory, it will be stored for some indeterminate time until it is overwritten by the system. The internal memory is organized as a first-in, first-out (FIFO) memory, with a capacity of storing N messages, where N depends on the capacity of the memory and/or the sizes of the messages. After a message is read, if the memory has reached its capacity, the first message in the stack will be deleted and the new message will be added to the stack. However, no unread messages would be deleted or overwritten, according to a preferred embodiment of the present invention.

The internal memory stores individual messages for some time, but the user does not know for how long. This may be sufficient, since the information in a message may not be valid for a long period of time. However, whether a problem is created by premature deletion of a stored message depends on message frequency and length.

According to a preferred embodiment, if a SIM card belonging to another subscriber is inserted into the card reader in the mobile communications terminal, all internally stored messages will be deleted to ensure security.

If the user wants to store any messages permanently, he transfers it to the external memory on the SIM card. This can be done at any time until the moment when another SIM card is inserted in the SIM card reader. The SIM card onto which the messages are to be transferred must be present in the SIM card reader when this transfer of messages is done. The user is prompted after reading the message if he wants to store it "permanently". Then he is guided in the display how to do this. For example, the prompt "STORE?" is displayed; the <S> button is pressed, the message is stored in the external memory. Otherwise nothing will happen with the message except that the "READ" flag is removed if it was still set. This feature is supported in the man-machine interface, i.e., the display and display software. By storing messages on the external SIM card memory, it is possible to transport the messages to another mobile communications terminal.

The present invention provides several advantages over the prior art. By using the internal and external memories together in a cooperative manner, the risk of running out of memory is reduced. Further, it is possible to maintain a message in a semi-stored state, since the messages in the FIFO internal memory will not be overwritten until necessary, that is, when the N+1 message is received. According to one embodiment, the user is prompted when a message is to be overwritten in the internal memory so that he may save it in the external memory if he so chooses.

Additionally, the user can decide after reading a particular message whether he wants to store it internally or make it transportable to another mobile communications terminal. This is achieved by transferring the message to the external memory on the SIM card.

Furthermore, it is possible to make an understandable man-machine interface since the user sees a difference in the use of the external and internal memory. In particular, the user can have access to the internal memory by pressing <RCL> <*>, and to have access to the external memory, the user uses the MENU mode.

FIG. 1 illustrates, in block diagram form, the pertinent portions of a mobile communications terminal according to an embodiment of the present invention. Any components not shown can be implemented as in known mobile communications terminals.

The mobile communications terminal 10 includes MMI 15 which is a man-machine interface, such as a display, for allowing the user to communicate with the mobile communications terminal. The terminal also includes HW INT 20 connected to the MMI 15 and the antenna 25. The antenna 25 first receives the SMS messages, as well as the other communications received by the mobile terminal, from other mobile terminals or from an SMS service center over the airwaves. HW INT 20 includes the conventional hardware found in a mobile communications terminal, such as the transceiver/receiver, central processing unit, keypad, power supply, etc. The message received by the antenna 25 is stored in the INT MEM 30 by execution of a program by the CPU. A display 22 is provided for displaying the SMS messages and any menu prompts needed for operation of the present invention. The display 22 is preferably constituted by two parts, an alpha-numeric display (AND) and a dialed digits display (DDD). The internal memory INT MEM 30 is connected to the MMI 15 and the HW INT 20.

A card reader 35 is provided for receiving a Subscriber Identity Module (SIM) card 40 which includes at least an external memory EXT MEM 45. The card reader 35 serves to connect the SIM card 40 to the mobile communications terminal. In particular, according to the present invention, the card reader 35 connects the EXT MEM 45 to the MMI 15, the INT MEM 30, and the HW INT 20.

According to a preferred embodiment, both the INT MEM 30 and EXT MEM 45 consist of at least one non-volatile memory, such as an EEPROM. Power is supplied to the SIM card 40 and its EXT MEM 45, and to the INT MEM 30, by the power supply of the cellular mobile terminal (not shown). In this way, the messages stored in the memories are not erased when the power to the cellular mobile terminal is turned off.

According to a preferred embodiment of the present invention, the mobile communications terminal takes advantage of both the internal memory INT MEM 30 and external memory EXT MEM 45 to store SMS messages. The internal memory is treated as if it belongs to the hardware equipment of the mobile communications terminal and the external memory belongs to the user and/or to the subscriber, that is, a SIM card.

FIG. 2 illustrates one possible embodiment of a software routine for implementing the present invention which is executed by the CPU and can be stored in a memory, such as a ROM, connected to the CPU in a known manner. The detailed implementation of the specific software routine disclosed herein is believed to be within the skill of the ordinary artisan once in possession of the information in the present disclosure.

At step 204, it is determined whether a new SIM card has been inserted in card reader 35. If so, for security purposes, all internal messages will be deleted (step 206).

At step 210, a short message SMS is received in the mobile communications terminal or mobile station MS by the antenna 25. As noted above, the SMS message is specified by the GSM specifications. It is contemplated that any other short message which is transmitted between mobile stations is within the scope of the present invention. After ending all communications or GSM signalling, the SMS message is stored in the internal memory INT MEM 30 (step 215) by the CPU.

INT MEM 30 is operated as a first-in, first-out (FIFO) memory which can contain a maximum of N messages, where N is dependent on the size of the memory and the length of the messages. The received SMS messages are stored in locations in the INT MEM 30 until N messages are received. If N+1 messages are received, message number 1 is overwritten. Then message number 2 is overwritten upon receipt of the next SMS message, and so on.

According to GSM standards, the maximum size of a SMS message is 160 characters. If a fixed record size is used, the capacity of the internal (and external) memory depends only on its size. If a particular message is shorter, and variable length records are used in the memory, more messages may be stored in the internal memory before the memory is full. A typical value for N may be between 10 and 20.

When the SMS message has been stored in the INT MEM 30, the user may be alerted with some kind of audio signal, and/or according to one embodiment, the word "MESSAGE" is flashed or otherwise displayed in the display 22 of the mobile station (step 220). The user can then retrieve the message by pushing a series of buttons on the keypad. According to one embodiment of the present invention, <RCL> <*> is used to signal that the user wants to recall the message. This series of keystrokes will place the mobile station MS in an SMS reading mode.

If the appropriate series of keystrokes is not received at step 225, a wait state is entered until the user presses the keystrokes to start the display of the SMS message by control passing back to step 225. Upon receiving the series of keystrokes (step 225), the message is displayed at step 230. According to one embodiment, if another message is received before the user reads the current message, he will be informed that a short message has arrived and can continue reading the messages in sequence.

After the user has read the message, he is asked, via a text displayed on the display, if he wants to store the message, delete the message, or end the SMS reading mode and read the message at a later time (step 235). The user indicates his selection by pressing appropriate buttons on the keypad which are accepted by the CPU. The choice of which buttons the user is to press may be indicated by the displayed text. The choice of the particular text displayed, i.e., the layout of the menu and the keypad buttons chosen, is within the skill of the ordinary artisan once in possession of the instant disclosure, and so will not be detailed.

If the user selects the option of storing the message without reading it, indicating that the message is to be read at a later time, the message previously stored in the internal memory INT MEM 30 is marked "READ" for later retrieval (step 240). It will not be deleted until N new messages have been received. A user can have access to these stored messages at any time by pressing <RCL> <*>, and the messages stored in internal memory can then be read in sequence. In particular, according to one embodiment, if a message remains unread, that is, the "READ" mark is not removed, it will not be overwritten or deleted from memory. That is, if the N+1 message is received, and the first message number 1 had not been read, as indicated by the "READ" tag, it will be skipped and message number 2 will be overwritten. If, however, a message stored in the INT MEM 30 has not been read, and a new SIM card belonging to a different subscriber is inserted, the unread messages will be deleted along with the others stored in the INT MEM 30 for security purposes.

If the internal memory is full, and none of the messages have been read, according to one embodiment, the user will be prompted to read and delete or store in the SIM external memory at least one of the unread messages. According to another embodiment, the system automatically will store the overflow in the SIM external memory. When that too fills up the user will be prompted to begin to delete messages.

If the user chooses to delete the message, it will be deleted, at step 245, from the internal memory INT MEM 30. However, the user will be prompted if the "READ" flag is on for a message he has chosen to delete and he will be prohibited from deleting it until it is read. If the user chooses to store the message, it will be transferred to an address in the external memory EXT MEM 45 in the SIM card 40 (step 250). When the EXT MEM 45 is full, an error message will appear and the user will be asked on the display to delete at least one of the messages stored in the EXT MEM 45 or to insert another SIM card.

Messages stored in the external memory EXT MEM 45 in the SIM card 40 and messages marked with a "READ" marked stored in the INT MEM 30, can be retrieved and read using a menu. If a message read using this menu is marked with a "READ" mark, once it is read, the mark is deleted. The message can now be overwritten or deleted.

The following is a written description of one implementation of the menus according to an embodiment of the present invention. The detailed software implementation of the described menu is within the skill of the ordinary artisan once in possession of this disclosure. Incoming messages are indicated with the text "MESSAGE" and a counter for the number of unread messages. The phone shall alternate between the normal stand-by presentation and the "MESSAGE" text. If the internal memory area for SMS messages is full, the text shall be changed to "MEM FULL".

Incoming SMS messages are stored in the internal memory, such as an EEPROM. The user can move them to the SIM card when reading them. The receipt of a SMS message is signalled by an indicator which informs the user of the message reception.

The command <RCL> <*> is used to start the reading of messages from the internal memory. There is also be a new menu which can be used to reach the messages on the SIM card.

The message text is preferably presented without word cutting unless necessary. Date and time of message is preferably presented together with the first text line.

The mobile terminal detects if the SIM card is replaced by another SIM. If so, the messages stored on the internal memory are removed. The actual removal of stored MESSAGES is not done until new messages (to the "new" SIM) are received.

A received message (unread message) is indicated with the text "MESSAGE" followed by the text "PRESS RCL *". The texts are, according to one embodiment, shown together with the current operator information in the following way:

5 sec: Operator/Signal strength/Battery then 3 sec: MESSAGE x (where x is the number of unread messages) then 2 sec: PRESS RCL * and then start again with the operator information.

The number of received messages (if greater than 1) are preferably indicated in the second to last position of the alpha-numeric display (AND) to avoid confusion with the battery indicator. If there are more than 9 unread messages, the two last positions are used.

If the current message was put in the last available storage position, the text is different. In particular, when the memory is full with unread messages, the text "MEM FULL" is presented during 2 seconds between the "MESSAGE" text and the "PRESS RCL*" text.

An audible indication is also to be given for each received message. In addition, the top-indicator is flashed in the same way as for incoming calls. This flashing due to the receipt of a message is stopped when any key is pressed.

The "MESSAGE" and "PRESS RCL*" texts remain on the display until the user has entered the read message mode by pressing <RCL> <*> or has entered the message menu. The texts have higher priority than the unanswered calls indicator. If a message is received during a call, the texts are presented together with the air-time information the same way as with the operator information.

At power on, the mobile terminal determines if the "MESSAGE" text is to be presented or not (i.e., the text actually shows if there are unread messages and not if a message has been received).

The messages stored on the internal memory can be read by using the command <RCL> <*>. First the unread messages are presented in order of reception and then the messages that have been read (but not moved to the SIM) are presented. It is also possible to read messages during calls (if not made impossible due to for example, processor load).

If the user presses <STORE> while reading a message, the message is moved into the external memory on the SIM card (and deleted from the internal memory). When the internal memory is full, the oldest read message is overwritten by the new message. If the memory is full of unread messages, the memory full indicator is displayed.

It is not necessary to select a message when attempting to read it. The first text line is presented immediately together with the time and date stamp. Once the user has scrolled to the second line and the dialed digits display (DDD) is cleared and remain empty during the presentation (unless the user, by a key sequence, moves a telephone number from the AND (the message) to the DDD).

The presentation, according to one embodiment, obeys the following rules.

- Words are not cut unless they contain more than 10 characters.
- If a word ends in the last position of the AND, the following blank is removed (i.e., next word starts in position one on the next "line"). All blanks are presented if there are more than one blank in a row.
- If the message contains characters that cannot be handled by the display, the characters are changed to the best possible alternative.
- The same presentation lines are used regardless of the scrolling direction.
- The control characters CR (carriage return) and LF (line feed) are handled but not indicated. If the combination CRLF is received the LF is ignored. If a LF or CR coincide with a "normal" new line, no extra line is inserted.

The following Table 1 contains a list of possible user actions while reading a message.

TABLE 1

| | |
|---|---|
| *, UP, MODE, 0–9 | Scroll forward one "line". When reaching end of a message: Scroll to top of next message. When reaching end of last stored message: Exit. |
| DOWN | Scroll backwards one "line". When reaching to top of message: No function. |
| CLEAR | Interrupt the reading of current message. Message shall be treated as unread. Return to Stand-by. |
| END | Remove current message. Jump to next message. |
| STORE | Move current message from internal memory to the SIM card memory. Message is deleted from the internal memory. If there is a telephone number of the display: Interrupt the reading of current message. Enter the STORE mode and give the user a possibility to store the number in the short number memory. When the storage process is finished return to the same line in the message. |
| RECALL | Jump to next message. Current message shall be treated as unread. Exit when pressed during last message. |
| SEND | If there is a number on the display: Exit the read message mode. Dial the number. Current message shall be considered as read. An error beep shall be generated if no number was found. |

Each message carries a Time and Date stamp showing the time and date of short message deposit in the Service Center. The time and date may be presented on the AND together with the first text line as HHMM DD-MM.

After the last line of a new message, the mobile terminal asks a "STORE?" question. If the user presses STORE the current message is moved from the internal memory to the SIM card. The terminal responds with the text "STORED" on the AND and the number of stored messages and the number of memory positions on the SIM is presented on the DDD.

If the SIM memory is full and the user presses STORE, the terminal sounds an error beep and present the text "MEM FULL". There is a time out of about 10 seconds during which time the terminal expects the user to enter the SMS menu and remove one or more messages from the SIM card external memory. If the time expires, the system returns to the previous state without doing anything.

To mark that there are no more new (unread) messages a line with * is presented. If there are no messages on the internal memory when the user enters <RCL> <*>, the text "EMPTY" is shown.

During the reading/scrolling of messages the timeout may be about 20 seconds. If no key is pressed within the allotted time when the system expects user input, the previous state is entered without anything being done.

If there is an incoming call during the reading of a message, the terminal exits the reading message mode and returns to Stand-by mode. The message shall be considered as unread.

Low battery warning interrupts the reading of messages. The message is considered as unread.

If the power is switched off during the reading of a message due to low power, the message is considered as unread. The "MESSAGE" indicator reappears the next time the terminal is switched on.

A new menu is included in mobile terminals incorporating the present invention for reading the messages stored on the external memory on the SIM card.

The menu header shall present the actual status of the SIM card regarding SMS messages: the number of stored messages and the maximum number of messages. Messages are presented the same way as when reading internally stored messages. The keys, as much as possible, have the same functionality during the message presentation. The "STORE?" question is replaced with an "ERASE?" question giving the user a possibility of removing stored messages from the SIM card memory.

Messages which are message class zero as specified by the GSM standards are stored in a separate memory position. According to GSM standards, message class zero refers to messages which are to be immediately displayed on the display.

The presentation of class zero messages obeys the same rules as for other messages concerning word cutting etc. The presentation is done automatically with one line at a time during 1 second. A beep informs the user of the arrival (and presentation start) of the message. The same beep as for other messages can be used.

The UP and DOWN keys can be used to speed-up the presentation/step one line backwards. The numeric keys can be used to stop the presentation temporarily. All other keys can be used to interrupt the message presentation.

There is a memory area for storage of one class zero message. If a new message arrives during the presentation of the previous message, the presentation of the old message is completed before switching over to the new one.

The following functions have higher priority than class zero messages (i.e. they are displayed instead of the message): low battery warning; incoming call; and NO service. The presentation of class zero messages has a higher priority than the "MESSAGE" indicator.

It is understood that other features allowing cooperation between the internal and external memories may be implemented within the scope of the present invention.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. An apparatus for providing cooperation between memories in a mobile communications terminal having messaging capabilities, said terminal including display means, said apparatus comprising:
   first means for storing at least one message in said mobile communications terminal on a first-in-first out basis;
   means including an antenna for receiving at least one message and storing the received message in said first means for storing;
   means for inputting commands relating to said at least one message displayed on the display means;
   second means for storing messages, said second means for storing comprising an external memory provided in a SIM card which is removably connectable to said mobile communications terminal;
   means, provided as an integral part of said terminal, for transferring said at least one message from said first means to said second means for storing responsive to a store command input by said inputting means;
   means for deleting all messages stored in said first means when a new SIM card is inserted belonging to a different subscriber and maintaining all messages stored in said first means when the SIM card belonging to the same subscriber is inserted and independently of whether the message stored has been read.

2. The apparatus according to claim 1, further comprising means for connecting said second means for storing to said mobile communications terminal.

3. The apparatus according to claim 2, wherein said means for connecting comprises:
   a card reader connected to said terminal;
   a removable card adapted to be received by said card reader for connection to said terminal, said second means for storing being connected on said removable card.

4. The apparatus according to claim 3, wherein said card is a subscriber identity module card.

5. The apparatus according to claim 1, wherein said first and second means for storing each comprise at least one non-volatile memory unit.

6. The apparatus according to claim 5, wherein said at least one non-volatile memory unit is an EEPROM.

7. The apparatus according to claim 1, further comprising:
   means for indicating receipt of said at least one message; and
   means for displaying said at least one message on the display means.

8. The apparatus according to claim 1, further comprising means for deleting one of the messages stored in said first means for storing in response to a delete command input by said inputting means.

9. The apparatus according to claim 1, further comprising means for marking one of said messages to be read in response to a read later command input by said inputting means.

10. The apparatus according to claim 1, wherein said second means for storing is disposed on a removable card and said apparatus further comprises means for connecting said card to said means for transferring.

11. The apparatus according to claim 1, wherein the messaging capabilities include a short message service feature.

12. The apparatus according to claim 1, further comprising:
  means for displaying a message stored in said first means for storing for reading by a user;
  means for marking a message with a read later mark in said first means for storing when the user does not want to read the received message;
  wherein said means for receiving and storing comprises:
    means for storing N received messages in locations in said first means for storing on a first-in, first-out basis; and
    means, responsive to the receipt of more than N messages, for overwriting messages stored in said first means for storing on a first-in, first-out basis, wherein if a message is marked with said read later mark, the message is not overwritten.

13. A mobile communications terminal having messaging capabilities comprising:
  receiver means including an antenna for receiving at least one message;
  an internal memory for storing said at least one message received by said receiver means on a first-in-first-out basis;
  a removable external memory provided in a SIM card for storing messages;
  means, provided as an integral part of said terminal, for providing cooperation between said internal memory and said external memory, said means for providing cooperation comprising means for transferring at least one message stored in said internal memory into said external memory responsive to an inputted store command; and
  means for deleting all messages stored in said first means when a new SIM card is inserted belonging to a different subscriber and maintaining all messages stored in said first means when the SIM card belonging to the same subscriber is inserted and independently of whether the message stored has been read.

14. The terminal according to claim 13, further comprising means for connecting said external memory to said mobile communications terminal.

15. The terminal according to claim 14, wherein said means for connecting comprises:
  a card reader connected to said terminal;
  a removable card adapted to be inserted into said card reader, said external memory being connected on said card.

16. The terminal according to claim 15, wherein said card is a subscriber identity module card.

17. The terminal according to claim 13, wherein said internal and said external memory each comprise at least one non-volatile memory unit.

18. The terminal according to claim 17, wherein said at least one non-volatile memory unit is an EEPROM.

19. The terminal according to claim 13, further comprising:
  means for indicating receipt of said at least one message; and
  means for displaying said at least one message.

20. The terminal according to claim 13, further comprising means for inputting commands regarding said at least one message.

21. The terminal according to claim 20, further comprising means for deleting one of the messages stored in said internal and said external memory in response to a delete command input by said inputting means.

22. The terminal according to claim 20, further comprising means for marking one of said messages to be read in response to a read later command input by said inputting means.

23. The terminal according to claim 13, further comprising:
  means for displaying a message stored in said internal memory for reading by a user;
  means for marking a message with a read later mark in said internal memory when the user does not want to read the received message;
  wherein said means for providing cooperation comprises:
    means for storing N received messages in locations in said internal memory on a first-in, first-out basis; and
    means, responsive to the receipt of more than N messages, for overwriting messages stored in the internal memory on a first-in, first-out basis, wherein if a message is marked with said read later mark, the message is not overwritten.

24. The terminal according to claim 13, wherein the messaging capabilities include a short message service feature.

25. A method of providing cooperation between an internal memory and an external memory, the external memory being provided in a SIM card, in a cellular mobile communications terminal having messaging capabilities, said method comprising the steps of:
  storing a received message in the internal memory, said internal memory being capable of storing multiple received messages, said step of storing comprising the steps of:
    storing N received messages in locations in the internal memory on a first-in, first-out basis; and
    when more than N messages are received, overwriting messages stored in the internal memory on a first-in, first-out basis, wherein if a message is marked with a read later mark, the message is not overwritten;
  displaying the received message on a display in the cellular mobile communications terminal;
  accepting commands concerning the displayed message selected by a user of the terminal and input using a keypad;
  transferring the displayed message to the external memory in response to a transfer command accepted in the step of accepting commands; and
  deleting all messages stored in said internal memory when a new SIM card belonging to a different subscriber is inserted and maintaining all messages stored in said first means when the SIM card belonging to the same subscriber is inserted and independently of whether the message stored has been read.

26. The method according to claim 25, further comprising the step of marking the displayed message with a read later mark for later reading in response to a read later command accepted in the step of accepting commands.

27. The method according to claim 25, further comprising the step of deleting the displayed message from the internal memory in response to a delete command accepted in the step of accepting commands.

28. The method according to claim 25, wherein the messaging capabilities include a short message service feature.

29. The method according to claim 25, further comprising the step of connecting the external memory to the cellular mobile communications terminal by a card reader connected to the terminal and a removable card adapted to be received by said card reader for connection to the terminal with the external memory being connected on said removable card.

30. The method according to claim 25, wherein said removable card is a subscriber identity module card.

* * * * *